F. HÜLSS.
ELECTRIC INDICATING DEVICE.
APPLICATION FILED OCT. 19, 1920.
1,433,078.
Patented Oct. 24, 1922.
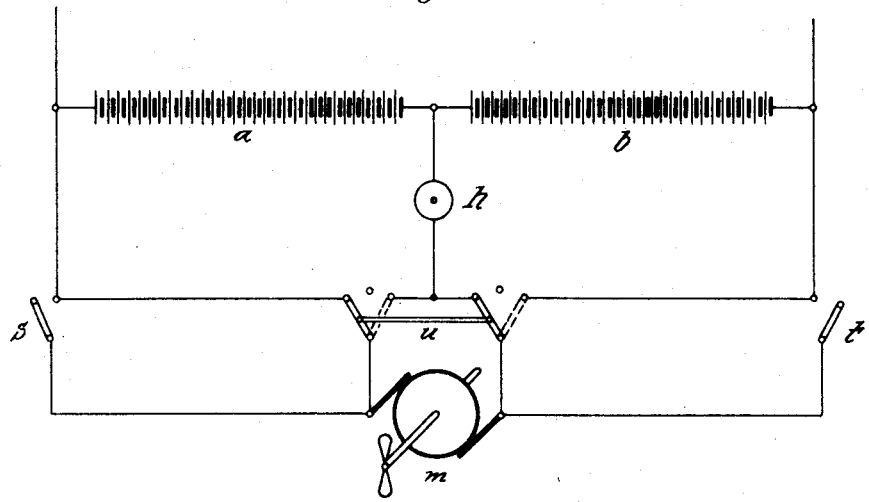
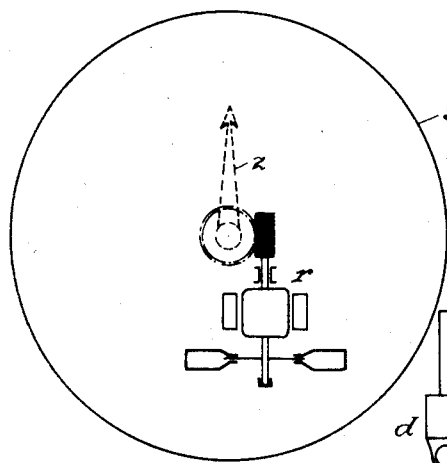
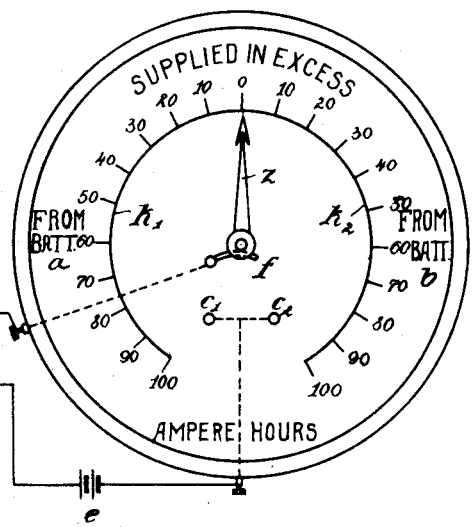
Friedrich Hülss, Inventor
By Knight Bro
Attorneys Patented Oct. 24, 1922.

1,433,078

UNITED STATES PATENT OFFICE.

FRIEDRICH HÜLSS, OF HALENSEE, NEAR BERLIN, GERMANY, ASSIGNOR TO SIEMENS-SCHUCKERTWERKE GESELLSCHAFT MIT BESCHRANKTER HAFTUNG, OF SIEMENS-STADT, NEAR BERLIN, GERMANY, A GERMAN CORPORATION.

ELECTRIC INDICATING DEVICE.

Application filed October 19, 1920. Serial No. 418,131.

*To all whom it may concern:*

Be it known that I, FRIEDRICH HÜLSS, a citizen of the German Empire, residing at Halensee, near Berlin, Germany, have invented certain new and useful Improvements in Electric Indicating Devices, of which the following is a specification.

My invention refers to electric indicating devices and more especially to a device for indicating the relative discharge conditions of a plurality of storage batteries.

If it be desired to run submarine boats, having a plurality of electric batteries, for a certain length of time with slow speed, it will be found expedient to connect the motors only to one of said batteries. However, in this case, there is the risk of this particular battery being very heavily discharged, so that there is not sufficient charge left, when this battery is connected in series with another battery for full speed. It thus becomes necessary that the difference in the consumption of current of the batteries shall not exceed a certain maximum. This can be obtained by alternately connecting the motors at slow speed with the batteries on hand.

In the drawings affixed to this specification and forming part thereof an installation of the kind mentioned above is shown by way of illustration. In the drawings Fig. 1 is a diagram showing the connection of the batteries, while Figs. 2 and 3 are diagrams of the current supply meter.

Referring to Fig. 1 of the drawings, the two batteries $a$ and $b$ feed a propeller motor $m$. By means of a throw-over switch $u$ and the single switches $s$ and $t$, the motor may be connected to either of the individual batteries as well as to both together in series. In the position in which the switches are shown in the drawing, the motor is connected to battery $a$ and derives the current from it exclusively, whereas when the throw-over switch $u$ is in the position shown in broken lines, the motor is connected to battery $b$. If the motor is to be fed simultaneously by both batteries for the purpose of increasing the voltage, then the throw-over switch $u$ is shifted into its neutral position and switches $s$ and $t$ are closed. Thus at any time current may be taken for other purposes from the outer poles of the batteries connected in series.

Now in order to be able to draw approximately the same amount of energy from both batteries, when both are simultaneously subjected to stress, the load in the case of low rates of speed is alternately transferred from one battery to the other as soon as the difference in the consumption of current of both batteries has attained the admissible degree for one battery. The extent of this difference, as also the particular battery from which said difference has been derived, may then be determined by reading off from measuring instruments the amount of current consumed in both batteries; by comparing the figures obtained with those resulting from previous readings, the difference in the consumption of current may be calculated. However, this process is not only complicated, it is also very apt to give rise to errors.

My present invention relates to a device which will render it possible to indicate quickly and absolutely reliably the relative discharge conditions of both batteries. This device comprises a current supply meter influenced by the discharge currents of both batteries, and which immediately indicates the difference of the amounts of current taken from both batteries, designating at the same time the particular battery which has supplied said difference.

In accordance with this invention there is suitably employed for the above mentioned purpose a meter of the type illustrated in Figs. 2 and 3. A counter $r$, disposed in a casing $g$, actuates an index $z$ in such a manner as to cause it to move in one direction when subjected to the influence of the current of the one battery, and in the opposite direction when acted upon by the current of the other battery. At the same time, the index or pointer is suitably arranged so that it will move in conjunction with the position assumed by the throw-over switch $u$ of the battery. The index is provided with a scale, consisting of two parts $k^1$, $k^2$ symmetrically disposed relatively to each other. The central or zero point common to both of these parts indicates the position of the meter for the symmetrical discharge of both batteries. Each part of the scale, comprises the maximum difference in the consumption of current admissible for both batteries.

The meter is first switched on when the batteries are uniformly charged. In that case, the index points to zero on the scale. If now current be withdrawn from battery $a$, the index will travel in the present instance in the counter clockwise direction. As soon as the index approaches the maximum admissible discharge difference, in the present case 100 ampere hours, the motor is switched over on to the other battery. Thereupon the index travels backwards, traverses the zero point and continues to move along the other part of the scale. When the index has attained its maximum position on that scale, the motor is again connected to the first battery. The position of the index on the left hand part of the scale shows that more current has been consumed in battery $a$ than in battery $b$; its position on the right hand part of the scale, indicates that more current has been consumed in battery $b$ than in battery $a$. The individual divisions of the scales indicate the amount of the difference in the consumption of current. If the motor be connected with its terminals to the ends of both batteries connected in series, for the purpose of increasing the voltage, then the index stops, and indicates the battery on to which the motor is to be connected when it is again to be connected to the individual batteries. A rapid indication of this kind is particularly valuable in cases where a shift in the crew has been made in the meantime.

The entire meter $h$ may be so constructed that it must be interconnected in the two supply circuits; it may, however, be so constructed as to render it suitable for interconnection in a circuit conducting the differential current of the two supply circuits, as shown by the meter $h$ in Fig. 1.

While I have shown as an example a plain indicator hand passing over a scale, my invention is not limited to the combination with that particular adjunct, since obviously any other suitable indicating means, known in the art, may be combined with my invention and operated by the meter to visibly indicate the above mentioned relative condition of the two batteries. The divisions marked on the meter depend upon the admissible difference of both batteries. If, for example, in the case of a battery of 100,000 ampere hours a difference in the discharge of 1% is to be allowed, then the meter must be arranged for 100 ampere hours. It thus follows that the new device may be easily constructed to suit the amount of discharge difference admissible such as will practically enter into consideration and which is very slight relatively to the total discharge.

Any error in determining the relative discharge conditions of both batteries is practically eliminated in connection with the novel device according to this invention. If it, however, be desired to safeguard against the attendant overlooking the moment when the maximum difference allowed has been attained, at which he should switch over the motor the meter may be combined with a signaling device, which will indicate either by acoustic or optical means the point when the maximum of the admissible difference has been attained. A device of this kind is illustrated diagrammatically in Fig. 3. The index $z$ when assuming either of its two extreme positions on the scale, bridges the spring contact $f$ and the stationary contacts $c^1$ or $c^2$, respectively, and this closes a circuit containing an electric alarm $d$ and a battery $e$.

I claim:

1. In an installation of the kind described in combination, a plurality of storage batteries and a current supply meter connected so as to be influenced by the discharge currents of said batteries and adapted to indicate directly the difference in the relative amount of current supplied by said batteries as well as the battery from which said difference has been supplied.

2. In an installation of the kind described two storage batteries and a current supply meter connected so as to be influenced by the discharge currents of both batteries, said meter having a counter, an index adapted to be moved by said counter and two scales arranged symmetrically with relation to each other, and having their zero points coinciding with the position of said index corresponding to an even discharge of either batteries.

3. In an installation of the kind described in combination, a plurality of storage batteries, a current supply meter connected so as to be influenced by the discharge currents of either of said batteries and adapted to indicate directly the difference in the relative amount of current supplied by said batteries as well as the particular battery from which such difference has been supplied, and a signalling device connected with said meter adapted to operate when the highest admissible difference in discharge is attained.

4. In an installation of the kind described two storage batteries, a current supply meter connected so as to be influenced by the discharge currents of both batteries, said meter having a counter, an index adapted to be moved by said counter and two scales arranged symmetrically with relation to each other, and having their zero points coinciding with the position of said index corresponding to an even discharge of either battery and a signalling device connected with said meter adapted to operate when the highest admissible difference in discharge is attained.

5. In an installation of the character described, two storage batteries and a current supply meter connected to said batteries so as to give indications in one sense when one battery discharges and in the other sense when the other battery discharges, and a suitable scale associated with said meter permitting it to indicate directly the difference in the relative amount of current discharged by said batteries as well as the battery from which said difference has been discharged.

6. In an installation of the character described, two storage batteries and a current supply meter connected to said batteries so as to run in one direction when one battery discharges and in the other direction when the other battery discharges, a counter operated by said meter for registering the amount of current discharged by either battery, said counter having an index, a scale for each battery disposed in operative relation to said index and disposed symmetrically to each other and having their zero points coinciding with the position of said index in which the meter has registered an equal amount of current discharged by either battery.

In testimony whereof I affix my signature.

FRIEDRICH HÜLSS.